(12) United States Patent
Sommer et al.

(10) Patent No.: US 11,898,283 B2
(45) Date of Patent: Feb. 13, 2024

(54) METHOD OF MAKING A SPUNBOND NONWOVEN LAMINATE

(71) Applicants: Sebastian Sommer, Troisdorf (DE); Tobias Wagner, Cologne (DE); Gerold Linke, Hennef (DE); Patrick Bohl, Troisdorf (DE); Morton Rise Hansen, Aalborg (DK)

(72) Inventors: Sebastian Sommer, Troisdorf (DE); Tobias Wagner, Cologne (DE); Gerold Linke, Hennef (DE); Patrick Bohl, Troisdorf (DE); Morton Rise Hansen, Aalborg (DK)

(73) Assignees: REIFENHAEUSER GMBH & CO. KG MASCHINENFABRIK, Troisdorf (DE); FIBERTEX PERSONAL CARE A/S, Aalborg (DK)

( * ) Notice: Subject to any disclaimer, the term of this patent is extended or adjusted under 35 U.S.C. 154(b) by 0 days.

(21) Appl. No.: 18/105,270

(22) Filed: Feb. 3, 2023

(65) Prior Publication Data
US 2023/0175176 A1   Jun. 8, 2023

Related U.S. Application Data

(63) Continuation of application No. 16/207,097, filed on Dec. 1, 2018, now Pat. No. 11,591,728.

(51) Int. Cl.
*B32B 5/26* (2006.01)
*B32B 5/02* (2006.01)
(Continued)

(52) U.S. Cl.
CPC ......... *D04H 1/43918* (2020.05); *B32B 5/022* (2013.01); *B32B 5/26* (2013.01);
(Continued)

(58) Field of Classification Search
CPC ........... D04H 1/43918; D04H 1/43912; D04H 1/43914; D04H 1/5412; D04H 1/5414;
(Continued)

(56) References Cited

U.S. PATENT DOCUMENTS

| | | | | |
|---|---|---|---|---|
| 5,382,400 A | * | 1/1995 | Pike | D04H 3/147 442/364 |
| 6,454,989 B1 | * | 9/2002 | Neely | D04H 3/007 264/168 |
| 2007/0249253 A1 | * | 10/2007 | Angeli | B32B 7/05 442/329 |

FOREIGN PATENT DOCUMENTS

EP          1959023 A1 *  8/2008   .............. H01M 2/16

* cited by examiner

*Primary Examiner* — Elizabeth M Imani
(74) *Attorney, Agent, or Firm* — Andrew Wilford

(57) ABSTRACT

A spunbond nonwoven laminate has a plurality of stacked spunbond nonwoven layers, namely at least two and at most four spunbond nonwoven layers that have crimped continuous filaments or consist of crimped continuous filaments. The degree of crimping of the filaments is different in each of these spunbond nonwoven layers, and each of the crimped filaments of the spunbond nonwoven layers has a crimp with at least two, preferably at least three, and more preferably with at least four loops per centimeter of length. The crimped filaments of the spunbond nonwoven layers are multicomponent filaments, particularly bicomponent filaments, with a first plastic component and a second plastic component present in the respective filament in a proportion of at least 10 wt %.

9 Claims, 5 Drawing Sheets

(51) Int. Cl.
*D04H 1/544* (2012.01)
*D04H 1/541* (2012.01)
*D04H 1/4391* (2012.01)
*D04H 3/10* (2012.01)
*D04H 13/00* (2006.01)
*D04H 1/559* (2012.01)
*D04H 3/007* (2012.01)
*D04H 3/16* (2006.01)

(52) U.S. Cl.
CPC ..... *D04H 1/43912* (2020.05); *D04H 1/43914* (2020.05); *D04H 1/544* (2013.01); *D04H 1/5412* (2020.05); *D04H 1/5414* (2020.05); *D04H 1/559* (2013.01); *D04H 3/007* (2013.01); *D04H 3/10* (2013.01); *D04H 13/002* (2013.01); *D04H 13/003* (2013.01); *B32B 2262/0253* (2013.01); *D04H 3/16* (2013.01)

(58) Field of Classification Search
CPC ........ D04H 1/544; D04H 1/559; D04H 3/007; D04H 3/10; D04H 13/002; D04H 13/003; D04H 3/16; B32B 5/022; B32B 5/26; B32B 2262/0253
See application file for complete search history.

METHOD OF MAKING A SPUNBOND NONWOVEN LAMINATE

CROSS-REFERENCE TO RELATED APPLICATIONS

This application is a division of U.S. patent application Ser. No. 16/207,097 filed 1 Dec. 2018, now U.S. Pat. No. 11,591,728, with a claim to the priority of European patent application 18 154 430.5 filed 31 Jan. 2018.

FIELD OF THE INVENTION

The present invention relates to a spunbond nonwoven laminate. More particularly this invention concerns a method of making such a laminate.

BACKGROUND OF THE INVENTION

A spunbond nonwoven laminate is known that has a plurality of stacked spunbond nonwoven layers, with spunbond nonwoven layers having crimped continuous filaments or consisting of crimped endless filaments. The invention further relates to a method and to an apparatus of making such a spunbond nonwoven laminate. In the context of the invention, "spunbond nonwoven" refers particularly to a spunbond fabric that is made by the spunbond process. Continuous filaments differ from staple fibers on account of their quasi endless length, whereas staple fibers have much shorter lengths of 10 mm to 60 mm, for example. The continuous filaments used in the context of the invention are particularly continuous filaments made of thermoplastic.

Spunbond nonwoven laminates of the above-described type are inherently known in various embodiments from practice. In the known spunbond nonwovens, problems often occur when a spunbond nonwoven is to be made having both a low weight per unit area and a large thickness and/or high volume. Large thicknesses are usually achieved through a high degree of crimping of the filaments. However, this creates a structure that is relatively vulnerable to mechanical influences or forces. For instance, the strongly crimped fibers tend to open the crimp loops under mechanical conditions. This can then result in a disadvantageously inhomogeneous nonwoven fabric. Nonwovens or nonwoven laminates are usually deposited on a conveyor belt and transferred from this conveyor belt to a calender. The forces acting on the nonwoven or nonwoven laminate can cause shifts or distortions in the nonwoven or on the nonwoven surface, resulting in an undesirable inhomogeneity of the nonwoven or nonwoven laminate. The speeds of the conveyor on the one hand and the calender on the other hand must therefore be coordinated with one another. Nevertheless, there remains a trade-off between a high nonwoven thickness or laminate thickness and a rapid and functionally reliable transfer between the conveyor belt and the calender.

In this context, a problem arises particularly in multibeam systems in which, for example, a plurality of spunbond beams or a spunbond beam, a melt-blown beam, and another spunbond beam are connected in series. In order to maintain a certain weight per unit area of the resulting nonwoven laminate, efforts are made to reduce the weights per unit area of the individual layers. However, the filament layers become more sensitive as a result, including to the application of a vacuum to the conveyor belt or mesh conveyor belt in particular. The lower layer of such a nonwoven laminate can be acted upon by the vacuum such that filaments are sucked into the interstices of the screen belt. This makes the transfer between conveyor belt and calender more difficult. In order to keep the related problems to a minimum, the thickness or the bulkiness of the individual layers, and hence the crimp as well, tends to be reduced in practice.

As a result, in the previously known measures of making relatively bulky nonwoven laminates, unwanted inhomogeneities had to be accepted and/or disadvantageous compromises had to be made at the expense of bulkiness.

Successful attempts to solve the above-described problems have already been made (US 2016/0221300). As part of the measures that are known in this respect, the lower layer of a nonwoven laminate consists of non-crimping or only very weakly curling filaments, while the upper layer or layers consist of crimping or more strongly crimping filaments. There is however still room for improvement here.

OBJECTS OF THE INVENTION

It is therefore an object of the present invention to provide an improved spunbond nonwoven laminate.

Another object is the provision of such an improved spunbond nonwoven laminate that overcomes the above-given disadvantages, in particular that has a high thickness and/or a relatively high degree of crimping of the filaments but in which a high level of homogeneity and stability of the individual layers is ensured, with the spunbond nonwoven laminate being particularly easy to transport and handle, especially from a conveyor belt to a calender.

A further object is to provide a method of and apparatus for making such a laminate.

These objects are to be attained effectively for spunbond nonwoven layers or spunbond nonwoven laminates having low weight per unit area.

SUMMARY OF THE INVENTION

To attain this object the invention first teaches a spunbond nonwoven laminate having a plurality of stacked spunbond nonwoven layers, namely at least two and at most four spunbond nonwoven layers that have crimped continuous filaments or consist of crimped continuous filaments, wherein the degree of crimping of the filaments is different in each of these spunbond nonwoven layers, and each of the crimped filaments of the spunbond nonwoven layers has a crimp with at least two, preferably at least three, and more preferably with at least four loops per centimeter of length, and the crimped filaments of the spunbond nonwoven layers are multicomponent filaments, particularly bicomponent filaments, with a first plastic component and a second plastic component present in the respective filament in a proportion of at least 10 wt %, preferably at least 15 wt %.

A very especially preferred embodiment of the invention is characterized in that the melt flow rate of the first component is 1 to 3 times, preferably 1.2 to 1.5 times greater than the melt flow rate of the second component, and/or the molecular weight distribution ($M_w/M_n$ or $M_z/M_w$) of the first component is smaller than the molecular weight distribution of the second component and/or the $M_w/M_n$ value or $M_z/M_w$ value of the second component is at least 1.1 times greater than that of the first component, and/or a difference in melting point between the first and the second component is at least 10° C.

Here $M_z$ is the z-average molar mass, $M_n$ is the number average molar mass, and $M_w$ is the mass average molar mass.

An embodiment in which the difference between the weights per unit area of the spunbond nonwoven layers with crimped filaments is less than 25%, preferably less than 15%, and more preferably less than 10% has proven to be especially advantageous in the context of the invention. According to an especially preferred embodiment of the invention, the difference between the weights per unit area of the spunbond nonwoven layers with crimped filaments is at most 5%, and the weights per unit area of the spunbond nonwoven layers with crimped filaments are preferably the same or approximately the same.

Two to four spunbond nonwoven layers made with crimped continuous filaments or made of crimped continuous filaments are thus used in the spunbond nonwoven laminate according to the invention, and the degree of crimping of the filaments is advantageously different in each of the spunbond nonwoven layers. According to the invention, the crimped filaments of each of these spunbond nonwoven layers has a crimp with at least two, preferably at least three loops per centimeter of its length. According to a recommended embodiment of the invention, each of the crimped filaments has a crimp with at least four loops and, according to another preferred embodiment, a crimp with at least five loops per centimeter of its length.

The number of crimps or loops per centimeter of length of the filaments is measured particularly according to Japanese standard JIS L-1015-1981 by counting the crimps under a prestress of 1 of 2 mg/den in (1/10mm), with the stretched length of the filaments being used as the basis. A sensitivity of 0.05 mm is used to determine the number of crimp loops. The measurement is advantageously carried out using a "Favimat" device from TexTechno, Germany. Reference is made in this regard to the publication "Automatic Crimp Measurement on Staple Fibers," Denkendorf Colloquium, "Textile Mess—und Prüftechnik" ["Textile Measurement and Testing Technology"] 9 Nov. 1999, Dr. med. Ulrich Mörschel (particularly p. 4, FIG. 4). For this purpose, the filaments (or the filament specimen) are (is) removed from the tray or the conveyor belt as a filament ball before further bonding, and the filaments are separated and measured.

According to a preferred embodiment of the invention, the degree of crimping of a lower spunbond nonwoven layer of stacked spunbond nonwoven layers (with crimped filaments) is less than the degree of crimping of at least one spunbond nonwoven layer that is on top of it. A recommended embodiment is characterized in that, in a spunbond nonwoven laminate having at least three spunbond nonwoven layers with crimped filaments, the degree of crimping of the filaments increases from the lowermost spunbond nonwoven layer (with crimped filaments) to the upper (third) spunbond nonwoven layer (with crimped filaments). A very especially preferred embodiment of the invention is characterized in that the degree of crimping of all of the stacked spunbond nonwoven layers (with crimped filaments) increases from bottom to top. In the context of the invention, an increase in the degree of crimping of the filaments means particularly an increase in the crimps per centimeter of filament length and/or a decrease in the crimp diameter or loop diameter. In other words, the degree of crimping increases as the number of loops per centimeter of filament length increases and/or as the loop diameter of the filaments decreases. The loop diameter is advantageously measured as follows: The nonwoven fabric to be measured is placed under a microscope and, using an appropriate magnification, a still image is made in which the loop diameter can be measured as shown in FIG. 5.

For spunbond nonwoven laminates with multiple layers, the optical system must be focused on the surface of each visible layer, so that the other surfaces or layers lie outside the depth of field to the greatest possible extent. Due to the random distribution of the filaments or the random distribution of the loop diameters, at least 25 measurements are required in each case. The arithmetic mean is used.

It has already been stated that, according to a preferred embodiment of the invention, the degree of crimping of the stacked spunbond nonwoven layers (with crimped filaments) increases from bottom to top. According to an alternative embodiment of the invention, the spunbond nonwoven laminate according to the invention has at least three spunbond nonwoven layers with crimped filaments, with at least two lower spunbond nonwoven layers having a degree of crimping that increases from bottom to top, whereas the at least one upper spunbond nonwoven layer, in turn, has a lower degree of crimping than the middle spunbond nonwoven layer. Moreover, it lies within the scope of the invention for melt-blown layers of melt-blown filaments and/or spunbond nonwoven layers of non-crimped filaments to also be provided in the spunbond nonwoven laminate according to the invention between the spunbond nonwoven laminates with crimped filaments. Such a laminate can then consist, for example, of three layers of spunbond nonwoven with crimped filaments and two layers of melt-blown nonwoven made of non-crimped filaments (e.g., in an SSMMS or also in an SMMSS arrangement). According to a recommended embodiment of the invention, the spunbond nonwoven laminate according to the invention comprises only spunbond nonwoven layers with crimped filaments.

According to the invention, the crimped filaments of the spunbond nonwoven layers are multicomponent filaments, particularly bicomponent filaments, with a first and a second plastic component. It is within the scope of the invention for the crimped multicomponent filaments and/or the crimped bicomponent filaments to have a side-by-side configuration and/or an eccentric core/sheath configuration. In principle, other crimpable configurations of multicomponent filaments or bicomponent filaments can also be used (e.g. island in the sea). According to a highly preferred embodiment of the invention, the melt flow rate of a first component of the bicomponent filaments or multicomponent filaments is 1.05 to 3 times, preferably 1.2 to 1.5 times greater than the melt flow rate of a second component and the molecular weight distribution ($M_w/M_n$ or $M_z/M_w$) of the first component is smaller than the molecular weight distribution of the second component, with the molecular weight distribution or the $M_w/M_n$ value or the $M_z/M_w$ value of the second component being at least 1.1 times greater than that of the first component.

A very especially recommended embodiment of the invention is characterized in that the first plastic component comprises a first plastic or is made of at least one first plastic and that the second plastic component comprises or is a mixture or a blend of at least one second plastic and at least one third plastic. The mass ratio of the first plastic component to the second plastic component is advantageously 50:50 to 95:5, preferably 50:50 to 90:10, particularly 60:40 to 90:10, and very preferably 70:30 to 80:20.

It lies within the scope of the invention if the second plastic component comprises or is a mixture or a blend of at least one second plastic and at least one third plastic. According to an especially preferred embodiment of the invention, the molecular weight distribution of the third plastic is greater than the molecular weight distribution of the first plastic and/or greater than the molecular weight distribution of the second plastic. According to one design variant, the molecular weight distribution of the third plastic is both greater than the molecular weight distribution of the first plastic and greater than the molecular weight distribution of the second plastic. The molecular weight distribution is measured particularly according to ASTM D1238-13.

A preferred embodiment of the invention is characterized in that the at least one first plastic and/or the at least one second plastic and/or the at least one third plastic is a polyolefin or a homopolyolefin and/or a polyolefin copolymer. A very especially recommended embodiment that has special significance in the context of the invention is characterized in that the first plastic and/or the second plastic and/or the third plastic is a polypropylene or a homopolypropylene and/or a polypropylene copolymer. According to an embodiment that has proven to be very advantageous, both the first plastic and the second plastic as well as the third plastic are a polypropylene (homopolypropylene) and/or a polypropylene copolymer and/or a mixture of a polypropylene (homopolypropylene) and a polypropylene copolymer. In that case, the aforementioned molecular weight distributions of the plastics are preferably implemented. When measuring the molecular weight distributions of polypropylene plastics according to ASTM D1238-13, trichlorobenzene is advantageously used as a solvent for the polypropylene plastic and the measurement of the solution is carried out at a temperature of 160° C., with the concentration being 1.5 g/l and an IR sensor being used as a sensor. The columns used in the measurement are calibrated with polystyrene standards, with the measurement results being converted to "polypropylene," particularly using the Mark Houwink equation. The following parameter set is advantageously used: Polystyrene: =0.7; K=0.0138 ml/g Polypropylene: =0.707; K=0.0242 ml/g.

According to a highly preferred embodiment of the invention, the second plastic component comprises a mixture or blend of at least one second plastic and at least one third plastic. Advantageously, the proportion of the third plastic relative to the entire second plastic component is advantageously 10 to 50 wt %. It is recommended that the proportion of the third plastic with respect to the total filament be less than 25 wt %.

It lies within the scope of the invention for the melt flow rate (MFR) of the first component to be 1.0 and/or 1.05 to 3 times, preferably 1.2 to 1.5 times greater than the melt flow rate of the second component. According to a preferred embodiment of the invention, the melt flow rate of the first plastic component is advantageously greater than the melt flow rate of a mixture or blend of the second and the third plastic (second plastic component). The melt flow rate of the first plastic component is advantageously at least 20% greater than the melt flow rate of the mixture or blend of the second and the third plastic. In the context of the teaching according to the invention, the melt flow rate (MFR) is measured particularly according to ASTM D1238-13 (condition B, 2.16 kg, 230° C.), specifically in grams of the polymer per 10 minutes (g/10 min). The melt flow rate of mixtures or blends is determined by measuring the melt flow rate of the polypropylene and using a logarithmic calculation to determine the melt flow rate of the blend.

According to an especially preferred embodiment of the invention, the spunbond nonwoven laminate according to the invention is a laminate that is bonded by calendering. During the preferred use of polyolefins, particularly of polypropylene for the plastics of the spunbond nonwoven laminate, calender bonding is preferably carried out at a calendering temperature between 100 and 160° C., preferably between 110 and 150° C.

One recommended embodiment of the spunbond nonwoven laminate according to the invention is characterized in that the laminate has a thickness of 0.1 to 0.9 mm, preferably 0.15 to 0.85 mm, more preferably 0.2 to 0.8 mm and, according to one embodiment of the invention, 0.3 to 0.6 mm. One embodiment of the invention that has proven to be very advantageous is characterized in that the spunbond nonwoven laminate according to the invention has a specific thickness of 0.6 to 3.2 mm/100 g/m$^2$, preferably a specific thickness of 0.8 to 3 mm/100 g/m$^2$, and very preferably a specific thickness of 1.0 to 2.8 mm/100 g/m$^2$.

According to a very preferred embodiment, the fineness (titer) of the crimped filaments in the laminate is from 0.7 to 3.2 denier, preferably from 0.8 to 3 denier, with this advantageously being the case for all spunbond nonwoven layers. It lies within the scope of the invention if the weight per unit area of the spunbond nonwoven laminate according to the invention is between 10 and 50 g/m$^2$ and preferably between 10 and 40 g/m$^2$. In principle, different cross-sectional configurations are possible for the filaments that are used in the context of the invention. In particular, they can be round, triangular, or rectangular in cross section. The crimped filaments can be void-free or substantially void-free, or they can also be hollow fibers.

In the context of the invention, very especially relevant importance is attached to the method of making a spunbond nonwoven laminate according to the invention. In that regard, the object of the invention is a method of making a laminate having a plurality of stacked spunbond nonwoven layers, wherein at least two and at most four of these spunbond nonwoven layers are made with or from crimped continuous filaments, and the degree of crimping of the continuous filaments in these spunbond nonwoven layers is different, the crimped filaments of the spunbond nonwoven layers are made as multicomponent filaments, particularly bicomponent filaments, with a first plastic component and a second plastic component, with each of these two components being present in the respective filament in a proportion of at least 10 wt %, preferably at least 15 wt %, and, for the filaments of at least one spunbond nonwoven layer with crimped filaments, preferably a plurality of spunbond nonwoven layers with crimped filaments, and more preferably all spunbond nonwoven layers with crimped filaments, the proportion of the plastic components is adjusted during execution of the method online, that is continuously during execution of the process, in order to vary the degree of crimping.

It lies within the scope of the invention if the proportion of the first and/or of the second plastic component is adjusted during execution of the method (online) in order to vary the degree of crimping.

An especially preferred embodiment of the method according to the invention is characterized in that the melt flow rate of the first component is 1 to 3 times, preferably 1.2 to 1.5 times greater than the melt flow rate of the second component, and/or the molecular weight distribution ($M_w/M_n$ or $M_z/M_w$) of the first component is smaller than the molecular weight distribution of the second component and/or the $M_w/M_n$ value or the $M_z/M_w$ value of the second component is at least 1.1 times greater than that of the first component, and/or the difference in melting point between the first and the second component is at least 10° C.

The adjustment of the proportion of the plastic components during execution of the method and/or the online adjustment of the proportion of the plastic components is of particularly essential importance in the context of the invention. Primarily, "adjustment during execution of the method" or "online adjustment" means particularly that the execution of the method is not interrupted for the adjustment of the component proportions or the plastic proportions and the adjustment of the component proportions or the plastic proportions thus takes place while the process is running and preferably continuously.

It lies within the scope of the method according to the invention if a respective supply unit, particularly a metering screw and/or metering pump and/or a spinning pump, is associated with each of the plastic components or the plastics for the spunbond nonwoven layers of crimped filaments and if the component supply or plastic supply is varied by at least one supply unit during operation (while online), particularly by varying the speed of the supply unit. By virtue of this possibility of variation, the degree of crimping of a spunbond nonwoven layer can be varied in a virtually free manner during online operation and be changed, for example, from a low degree of crimping toward a high degree of crimping as needed. If the degree of crimping of several spunbond nonwoven layers or of all spunbond nonwoven layers with crimped filaments is to be varied, simultaneous variation or online variation of all spinning beams or spinnerets is advantageously carried out simultaneously on the multibeam system used to make the spunbond nonwoven laminate. Waste material in particular can be effectively minimized in this way.

According to a recommended embodiment of the invention, the proportion and/or the composition of the plastic components, more particularly of the second plastic component, is varied during execution of the method (online) by adjusting at least one supply unit for the plastic components, more particularly for the second plastic component, preferably as a function of the properties or parameters of the spunbond nonwoven layer made therewith, with it being recommended that the supply unit or units be controlled by hardware and/or software components. In fact, according to a preferred design variant, this is preferably done automatically as a function of determined or measured properties of the spunbond nonwoven layer made therewith. It lies within the scope of the invention if the composition of the plastic components, more particularly of the second plastic component, is varied online through adjustment of at least one device, preferably at least one supply unit for the plastic components, more particularly for the second plastic, and/or through adjustment of at least one device, preferably at least one supply unit for the plastic components, more particularly for the third plastic of the second plastic component, recommendably in the manner described above.

According to a preferred embodiment, as already indicated above, the supply unit is a metering screw and/or metering pump, and the adjustment is preferably made by changing the speed of a metering screw. Above all, it is recommended that the above-described online adjustment of the composition of the plastic components, more particularly of the second plastic component, be possible on all of the spinning beams or spinnerets of the multibeam system and be carried out on all of the spinning beams or spinnerets of the multibeam system.

It lies within the scope of the invention if, during the manufacture of bicomponent filaments or multicomponent filaments, a spinning pump is provided downstream from the extruder for each plastic component as a supply unit for this plastic component. According to one embodiment of the invention, "supply unit" (or "metering pump") refers to a spinning device or also a spinning pump. It therefore lies within the scope of the invention if the mass flow rate of the individual plastic components of the bicomponent filaments or multicomponent filaments is adjusted online or more particularly during execution of the method on at least one spinning pump, advantageously by varying the speed of the respective spinning pump.

In the course of the method according to the invention, it is advantageous for a respective extruder to be used for each of the plastic components of the bicomponent filaments or multicomponent filaments to be made. A spinning pump for the respective plastic component is recommendably provided downstream from each one of these extruders as a supply unit, and the amount of each plastic component being fed in and thus the composition of the bicomponent filaments or multicomponent filaments can be adjusted online, more particularly during execution of the method, by adjusting spinning pump, more particularly the speed of the spinning pump. It lies within the scope of the invention if at least one plastic component (particularly the second plastic component) of the bicomponent or multicomponent filaments is a plastic blend, with this plastic blend comprising a primary plastic (particularly second plastic) and at least one secondary plastic (particularly third plastic). According to a recommended embodiment, a supply unit, particularly in the form of a metering screw, is provided upstream from the extruder for the respective plastic component (particularly second plastic component) for each secondary plastic. The composition of the second plastic component can be varied online by adjusting this supply unit or metering screw during execution of the method. It also lies within the scope of the invention for no supply unit to be provided for the primary plastic (particularly second plastic) of the plastic component, more particularly of the second plastic component, and this is replenished as needed by gravity and fed for example to the extruder.

The invention is based on the discovery that, in order to rapidly vary the degree of crimping of a spunbond nonwoven layer and to rapidly change from one filament composition to another filament composition, it is advantageous to work with the same raw material (plastic) or with the same type of raw material (plastic) and that polyolefins, above all, particularly polypropylenes, are suitable for this purpose and especially the polyolefins or polypropylenes with the properties outlined here. The optimization or variation of the degree of crimping can then be achieved in a particularly simple manner by changing the component proportions of the filaments of a spunbond nonwoven layer or by changing the proportions of a plastic mixture or plastic blend used.

It lies within the scope of the method according to the invention if the first plastic component of the crimping filaments of a spunbond nonwoven layer is made from at least one first plastic and if the second plastic component of the crimping filaments of a spunbond nonwoven layer is made from at least one second plastic and at least one third plastic. Furthermore, it also lies within the scope of the invention if the proportion of the third plastic is adjustable or adjusted during execution of the method (i.e. while online) in order to vary the degree of crimping of the respective spunbond nonwoven layer. The proportion of the second plastic and the third plastic (of the second plastic component) is advantageously varied during execution of the method (i.e. while online). It has already been found that, according to an especially recommended embodiment of the invention, the second plastic and/or the third plastic is a polyolefin, particularly a polypropylene. When polyolefin, particularly polypropylene, is used, an especially simple and functionally reliable online variation of the proportion of the second plastic and/or of the proportion of the third plastic of the filaments of a crimping spunbond nonwoven layer can take place.

According to an especially preferred embodiment of the method according to the invention, the laminate is bonded by calendering in at least one calender.

In this regard, the invention is based on the discovery that the inventive online variation of the proportion of the plastic component, more particularly of the proportion of plastic of the crimped filaments of a spunbond nonwoven layer, can be used in an especially effective manner to obtain a spunbond nonwoven laminate from the individual spunbond nonwoven layers that can be passed in a simple and functionally reliable manner from a tray or conveyor belt to a calender, particularly without a great or excessive difference between the speeds of the conveyor belt on the one hand and the calender rolls on the other.

It lies within the scope of the invention if the spunbond nonwoven laminate is transferred from a conveyor, preferably from a mesh conveyor belt, to a calender and if the speed of the conveyor or mesh conveyor belt is less than the peripheral speed of the calender rolls and if the peripheral speed of the calender rolls is no more than 8%, preferably no more than 5% greater than the speed of the conveyor or mesh conveyor belt. The inventive possibilities for online variation make compliance with such a relatively small difference in speed unproblematic, and the spunbond nonwoven laminates calendered in this way are characterized by a trouble-free and defect-free design and by a homogeneous structure with regard to their individual spunbond nonwoven layers.

The object of the invention is also an apparatus of making a spunbond nonwoven laminate having a plurality of stacked spunbond nonwoven layers, wherein at least two and at most four spunbond nonwoven layers have crimped continuous filaments or consist of crimped continuous filaments, wherein the apparatus has a row of spinning beams or spinnerets, with it being possible to make a respective spunbond nonwoven layer with/of crimped multicomponent filaments, particularly bicomponent filaments, with at least a portion of the spinning beams, particularly with two to four spinning beams, at least one, preferably one extruder is associated with a spinning beam for each plastic component of the crimped multicomponent filaments and/or bicomponent filaments with which the plastic component can be fed to the spinning beam or spinneret, and at least one supply unit is associated with each extruder with which the quantity and/or the composition of at least one plastic component can be varied during operation of the apparatus (online).

According to a highly recommended embodiment, at least one supply unit, particularly in the form of at least one metering screw, is provided upstream from at least one extruder, and it is possible for this supply unit or metering screw to vary the composition of the plastic component fed to the extruder and/or the quantity of the plastic mixture components fed to the extruder during operation of the apparatus (online).

Furthermore, it lies within the scope of the invention if at least one supply unit, particularly in the form of a spinning pump, is provided downstream from at least one extruder and if the quantity of the plastic component fed to the spinning beam or spinneret can be varied during operation of the apparatus (online) with this supply unit.

According to a preferred embodiment of the apparatus according to the invention, at least one extruder, more particularly one extruder for supplying a first plastic component of a first plastic on the one hand and, on the other hand, at least one, preferably one second extruder for supplying a second plastic component, particularly in the form of a blend of a second and a third plastic, is associated with at least one spinning beam, wherein two supply units are provided upstream from the second extruder for the blend, a supply unit for the second plastic component and the second supply unit for the third plastic component is provided, and the supply unit for the second plastic and/or the supply unit for the third plastic can be controlled with or without feedback during operation of the apparatus (online) in order to vary the quantity and/or proportion of the second plastic and/or of the third plastic in the blend and hence in the multicomponent filaments or bicomponent filaments (online). It is advantageous if at least one, more particularly only one spinning pump is associated with and provided downstream from each extruder of a spinning beam and the mass ratio between the plastic components of the multicomponent filaments or bicomponent filaments and particularly the mass ratio between a first component and a second component of the bicomponent filaments can be adjusted online or more particularly during execution of the method through online adjustment of the spinning pumps. In the context of the invention, this mass ratio of a first plastic component to a second plastic component of crimpable bicomponent filaments is preferably 70:30 to 90:10 or 50:50 to 80:20.

According to an especially preferred embodiment of the invention, the following apparatus is used to make a spunbond nonwoven layer of crimped continuous filaments by a spinning beam: With the spinning beam (spinning device, spinneret), the continuous filaments are spun in the form of multicomponent filaments, particularly bicomponent filaments, and subsequently passed through a cooler in order to cool the filaments. Preferably, at least one monomer extractor with which extraction from the filament-forming space takes place directly below the spinning beam is provided between the spinning beam and the cooler, so that, in addition to air, the actual gases generated during the spinning of the filaments in the form of decomposition products, monomers, oligomers, and the like can be removed from the system. Cooling air is preferably applied from opposite sides to the filament curtain made by the spinning beam. One recommended embodiment is characterized in that the cooler is divided into at least two cooling chamber sections that follow each other in the direction of flow of the filaments in which process air of different temperature can be supplied.

It lies within the scope of the invention if a stretcher is provided downstream of and/or below the cooler with which the filaments passing through the cooler can be drawn or stretched. Advantageously, an intermediate passage that is preferably embodied so as to converge toward the filament placement area or converges in a wedge shape directly adjoins the cooler. After passing through the intermediate passage, the filament curtain preferably enters a down-stretch passage of the stretcher. One recommended embodiment of the invention that is of very special importance is characterized in that the subassembly of the cooler and the stretcher or the subassembly of the cooler and the intermediate passage and the lower passage is closed. Here, the term "closed aggregate" means that, in addition to the supply of process air and/or cooling air in the cooler, no additional air is supplied to this unit and the unit is thus closed to the outside.

It is recommended that the continuous filaments emerging from the stretcher be passed through a deposition unit having at least one diffuser. According to one design variant, at least two diffusers are provided one downstream of the other. After passing through the deposition unit, the filaments are advantageously deposited on a conveyor that is preferably a mesh conveyor belt. There, the filaments are deposited to form the nonwoven web or spunbond nonwoven layer. It is recommended that the mesh conveyor belt be a continuous belt. The nonwoven web or spunbond nonwoven layer can be deposited onto at least one spunbond nonwoven layer that has already been formed with another spinning beam, thereby forming a spunbond nonwoven laminate.

According to a recommended embodiment of the apparatus according to the invention, process air is drawn through the mesh conveyor belt in the delivery area of the filaments made by a spinning beam in an extraction area. A plurality of extraction areas can also follow one another in the direction of conveyance of the nonwoven web.

The invention is based on the discovery that, with the method according to the invention and with the apparatus according to the invention, spunbond nonwoven laminates of great thickness and high volume can be made with different degrees of crimping of the spunbond nonwoven layers, and in a simple, functionally reliable, and inexpensive manner at that. A high level uniformity or homogeneity and stability of the individual spunbond nonwoven layer can be achieved. It is essential for the stability and strength of the entire spunbond nonwoven laminate to be able to be adjusted and ensured in a simple and quick manner so that it can be transferred without disruptive interference from a mesh conveyor belt to a bonding device, particularly to a calender. The transfer to the calender can be performed with an advantageously low difference in speed between the mesh conveyor belt and the calender rolls. The invention is also based on the discovery that these substantial advantages can be put into practice by a simple online adjustment of the filament compositions of the individual spunbond nonwoven layers in adapting them rapidly and continuously to the desired results. Furthermore, the invention is based on the discovery that such a rapid online change from one filament composition to another for a spunbond nonwoven layer can be achieved with particular ease when working with the same raw material for the individual filament components, with the raw material differing only in terms of its different individual parametric characteristics. In particular, the invention is based on the discovery that particularly good results are achieved in the online adjustment of the filament compositions when polyolefins, particularly polypropylenes or polypropylene copolymers, are used for the individual filament components, or if corresponding mixtures/blends of these plastics are used for a filament component. It is also especially advantageous that already existing spunbond devices in the form of multibeam systems can be easily converted into apparatuses according to the invention. The spunbond nonwoven laminates according to the invention are suitable above all as products in the field of hygiene, but they can also be used in principle in other areas of application.

In the following embodiments, spunbond nonwoven layers or spunbond nonwoven laminates were made from crimped bicomponent filaments made of polypropylene. The first plastic component of the bicomponent filaments consisted of a polypropylene component PP1, and the second plastic component consisted either only of a polypropylene component PP2 or of a mixture or a blend of polypropylene components PP2 and PP3. An apparatus as illustrated in FIG. 2 and explained in greater detail in the description of the figures was used at each spinning beam or each spinneret. When using a blend of PP2 and PP3, two metering screws were provided upstream from the extruder for the second plastic component, each of which was intended for the polypropylene component PP2 or for the polypropylene component PP3. The speed of the two metering screws was able to be varied online or more particularly during execution of the method without switching off the apparatus.

Embodiment 1

In this embodiment, a spunbond nonwoven layer (spunbond layer) of crimped bicomponent filaments was made in a side-by-side configuration and with a round filament cross section. The continuous online adjustment of the filament composition according to the invention was carried out on the layer. The mass ratio of the first plastic component (polypropylene component PP1) to the second plastic component (blend of polypropylene components PP2 and PP3) was 70:30. The bicomponent filaments were made with a filament fineness of from 1.7 to 1.8 den. The spunbond nonwoven layers were each bonded with a calender with a calender surface temperature of 140° C., particularly with a 12% embossing area with round bonding bumps in a density of 25 fig/cm$^2$ (fig=bonding bumps). A homopoly-propylene (PP1) having a melt flow rate (MFR) of about 35 g/10 min was used as the first plastic component of the bicomponent filaments. The homopolypropylene "Exxon 3155" was used here for the first plastic component. A blend of a homopolypropylene (PP2) and another homopolypropylene (PP3) was used as the second plastic component of the bicomponent filaments, with both homopolypropylenes having a melt flow rate (MFR) of about 25 g/10 min and the molecular weight distribution (MWD) of PP3 being greater than that of PP2. In the present case, "Basell Moplen HP561R" was used as homopolypropylene PP2, and "Basell Moplen HP552R" was used as homopolypropylene PP3. This filament composition is referred to here and in the following as PP combination A. Crimped spunbond nonwoven layers having a weight per unit area of 25 g/m$^2$ were made with these bicomponent filaments. In the spunbond process of making the bicomponent filaments, the proportion of PP3 in the blend of the second plastic component was varied from 0 to 45% PP3 during execution of the method. The speed of the two metering screws for PP3 and PP2, respectively, that were provided upstream from the extruder for the second plastic component upstream was changed online appropriately. The mass ratio 70:30 between the first and second plastic components remained unchanged.

TABLE 1

Online variation of the PP3 content for PP combination A:

| No. | Quantity of PP3 [%] | Layer thickness [mm] | MD stretch [%] | MD force at 5/10% stretch | Increase in speed [%] | Loop count [1/10 mm] | Loop diameter [μm] |
|---|---|---|---|---|---|---|---|
| 1 | 0  | 0.34 | 92  | 7/11.9  | 0  | 2.3  | 745 |
| 2 | 15 | 0.41 | 128 | 2.7/4.7 | 1  | 5.4  | 580 |
| 3 | 30 | 0.67 | 137 | 1.4/2.2 | 9  | 9    | 427 |
| 4 | 45 | 0.69 | 135 | 1.8/2.8 | 15 | 11.6 | 252 |

In this table and in the following tables, it becomes clear that the MD stretch, the thickness or layer thickness, and the necessary increase in the speed of the calender react or vary in like manner when the amount of polymer or PP3 is changed. What is more, the MD force at 5/10% stretch characterizes the stiffness of the nonwoven deposit.

With otherwise the same conditions as above, a slightly different PP combination B was used for the bicomponent filaments of the spunbond layer. A "Borealis HH450FB" homopolypropylene was used here as PP1, and a "Borealis HG475FB" homopolypropylene was used here as PP2. The PP3 plastic remained unchanged ("Basell Moplen HP552R"). The melt flow rates indicated above also apply to these plastics, as does the ratio of molecular weight distributions indicated above. When the PP3 content was varied from 0 to 45% PP3, this PP combination B yielded the following results:

TABLE 2

Online variation of the PP3 content for PP combination B:

| No. | Quantity of HP552R [%] | Layer thickness [mm] | MD stretch [%] | MD force at 5/10% stretch | Speed increase [%] | Loop diameter [μm] |
|---|---|---|---|---|---|---|
| 5 | 0  | 0.35 | 88  | 7.2/12.1 | 2   | 599 |
| 6 | 15 | 0.47 | 136 | 1.1/4.1  | 2   | 504 |
| 7 | 30 | 0.68 | 137 | 1.9/3.4  | 6.5 | 264 |
| 8 | 45 | 0.64 | 147 | 1.7/2.6  | 10  | 260 |

Incidentally, the increase in speed indicated in the tables refers to the increase in the speed from the mesh conveyor belt to the calender rollers that is required for a functionally reliable transfer of the layer. The two tables show that an increased proportion of PP3 generally results in a greater layer thickness and a lower secant modulus as well as in a greater increase in speed between mesh conveyor belt and calender. Particularly in table 1 (PP combination A), it can be seen that a higher proportion of PP3 results in more pronounced crimping. The number of loops increases with the PP3 content, and the crimp diameter (loop diameter) decreases analogously with the PP3 content. Moreover, it can be seen from the tables that a PP3 content of 45% does not always result in an increased thickness compared to a PP3 content of 30%. It seems appropriate to choose 50% as the maximum proportion of PP3.

With the polypropylene plastics that were used, simple and precise online variation of the PP3 content was able to be carried out without problems during execution of the method. The optimal proportion of PP3 can thus be achieved online without great effort, particularly including in terms of a functionally reliable transfer of the layer from the mesh conveyor belt to the calender with an optimum difference in speed. Good results can be seen here above all in examples 1 to 3 and 5 to 7.

Embodiment 2

In this embodiment as well, a spunbond nonwoven layer (spunbond layer) of crimped bicomponent filaments was made in a side-by-side configuration and with a round filament cross section. A continuous online adjustment of the filament composition according to the invention was performed on the layer; in particular, the mass ratio of the first plastic component (polypropylene component PP1) to the second plastic component (polypropylene component PP2) was changed here online. For this purpose, the mass flow rate or the speeds of the spinning pumps that were provided downstream from the two extruders for the two plastic components was varied during execution of the method or online (see FIG. 2b with reference symbols P1 and P2 for the two spinning pumps). Here again, as in embodiment 1, only one spinning beam was used, and bicomponent filaments having a filament fineness of about 1.7 den were spun. The spunbond nonwoven layers were each bonded using a calender according to the specification in embodiment 1, in this case with a calender surface temperature of 130° C. Spunbond nonwoven layers with a weight per unit area of 20 g/m$^2$ were made at a travel speed of 125 m/min. The first plastic component of the bicomponent filaments was a homopolypropylene (PP1) with a melt flow rate (MFR) of about 25 g/10 min; in particular, the homopolypropylene "Basell Moplen HP 561R" was used for the first plastic component. In this embodiment, no blend was used as the second plastic component, but rather only one plastic in the form of a random polypropylene copolymer having a melt flow rate (MFR) of about 30 g/10 min. Here, the polypropylene copolymer "Basell Moplen RP 248 R" was used for the second plastic component. The difference in melting point between the first plastic component (PP1) and the second plastic component (PP2) was 12° C. As already set out above, the mass ratio of the two plastic components was changed by varying the throughput of the two spinning pumps online or more particularly during execution of the method. In table 3 below, the quantity of the first plastic component (PP1) is indicated in percent. In addition, the melting point of the plastics or polymers is measured by DSC according to ISO 11357-3.

TABLE 3

| No. | Quantity of PP1 [%] | Thickness [mm] | MD stretch at max. force [%] | MD max. strength [N/5 cm] | Increase in speed [%] | Loop diameter [μm] |
|---|---|---|---|---|---|---|
| 9  | 30 | 0.53 | 157 | 19.4 | 1.6 | 245 |
| 10 | 40 | 0.49 | 152 | 24.2 | 0.5 | 240 |
| 11 | 50 | 0.39 | 161 | 33.4 | 0.5 | 223 |

TABLE 3-continued

| No. | Quantity of PP1 [%] | Thickness [mm] | MD stretch at max. force [%] | MD max. strength [N/5 cm] | Increase in speed [%] | Loop diameter [μm] |
|---|---|---|---|---|---|---|
| 12 | 60 | 0.33 | 146 | 39.3 | 0.5 | 332 |
| 13 | 70 | 0.29 | 140 | 48 | 0.5 | 537 |
| 14 | 80 | 0.29 | 123 | 51.6 | 0.5 | 513 |

It can be seen that the thickness of the spunbond nonwoven layer is greatest when the first plastic component (PP1) is present in a proportion of 30 wt %. This represents an optimal compromise between thickness and increase in speed, particularly for example no. 10. Since a blend is not used in this embodiment for the second plastic component, it is not necessary to use two metering screws in front of an extruder. The online variation of the proportion of the two plastic components (PP1, PP2) is done only by changing the speed of the two spinning pumps for the two plastic components.

Embodiment 3

Three-layer spunbond nonwoven laminates were each made from crimped bicomponent filaments using a spunbond device with three spinning beams (see also FIGS. 1 and 2). In each case, the laminate was carried out using the calender parameters according to embodiment 1. Each of the spunbond nonwoven laminates was made with a weight per unit area of 25 g/m² at a travel speed of 400 m/min. Each row and each number in table 4 below thus corresponds to a three-layer spunbond laminate. The spunbond nonwoven laminates according to numbers 17 and 18 use the above-specified PP combinations A and B, respectively, for all three spunbond nonwoven layers. However, the spunbond nonwoven laminates according to numbers 15 and 16 have a PP combination C for all three layers. In this PP combination C, the first plastic component corresponds to the homopolypropylene PP1 from PP combination A (MFR of about 35 g/10 min, "Exxon 3155"), and this "Exxon 3155" plastic is also used in the blend (mixture) of the second plastic component as homopolypropylene PP2. In contrast, a homopolypropylene having a melt flow rate of 13 g/10 min is used as an additional homopoly-propylene PP3 of the blend of the second plastic component with a wide molecular weight distribution ("Basell Moplen HP552N"). In turn, the molecular weight distribution of this homopolypropylene PP3 is greater than the molecular weight distribution of the homopolypropylene PP2 and also greater than that of the homopolypropylene PP1 that is identical to PP2.

The mass ratio of the first plastic component to the second plastic component of the bicomponent filaments is indicated in table 4 below for the individual spinning beams of the three-beam system, and the proportion of homopolypropylene PP3 in the blend of the second plastic component is also indicated.

TABLE 4

Three-layer spunbond nonwoven laminates with PP combinations A, B, and C:

| No. | PP-combination | Mass ratio of components 1:2 | | | Quantity of PP3 [%] | | |
|---|---|---|---|---|---|---|---|
| | | Beam 1 | Beam 2 | Beam 3 | Beam 1 | Beam 2 | Beam 3 |
| 15 | C | 80:20 | 70:30 | 70:30 | 25 | 25 | 25 |
| 16 | C | 90:10 | 70:30 | 70:30 | 25 | 25 | 25 |
| 17 | A | 80:20 | 80:20 | 80:20 | 10 | 45 | 45 |
| 18 | B | 80:20 | 80:20 | 80:20 | 10 | 30 | 30 |

TABLE 5

| No. | Thickness [mm] | Increase in speed [%] | MD stretch [%] | MD tensile force [N/5 cm] | MD tensile force at 5/10% stretch [N/5 cm] | Beam 1 loop diameter [μm] | Beam 3 loop diameter [μm] |
|---|---|---|---|---|---|---|---|
| 15 | 0.57 | 6 | 149 | 22.4 | 2.1/3.4 | 392 | 342 |
| 16 | 0.45 | 4.5 | 129 | 24.5 | 2.8/4.4 | 546 | 386 |
| 17 | 0.53 | 4.5 | 141 | 22.1 | 2.4/3.8 | 496 | 399 |
| 18 | 0.44 | 5 | 116 | 30.3 | 4.3/6.8 | 527 | 450 |

In example 15 and 16 with PP combination C, a different mass ratio of the two components of the bicomponent filaments was set on the first spinning beam in comparison to the other two spinning beams. The quantity of PP3 remained the same for all three beams at 25%. In contrast, in examples 17 and 18 with PP combinations A and B, the mass ratio of the two components remained constant for all three beams, while the quantity of PP3 was changed. It is possible to achieve optimum thickness and satisfactory strength values for all spunbond nonwoven laminates while nevertheless maintaining the trouble-free and functionally reliable manageability of the laminates (transfer to the calender with a relatively low increase in speed). It is also obvious that, by adjusting the crimp gradient, the MD tensile force at 5% or 10%, for example that is the secant modulus for this stretch, is influenced. This adjustment of the individual layers enables satisfactory processing properties (winding and unwinding properties, neck-in, etc.) to be achieved while maintaining certain thickness requirements, among other things. The loop diameters in table 4 show that the lower layer made with the first spinning beam has a larger loop diameter than the uppermost layer made with the third spinning beam and thus also than the middle layer that is identical to the uppermost layer in terms of the quantities of plastic used. This results in a change in the degree of crimping or a "low"/"high"/"high" crimp gradient for the three layers of all four spunbond nonwoven laminates (from the lowermost to the uppermost layer). Such a spunbond nonwoven laminate is shown in FIG. 4a, for example. This corresponds to the preferred embodiment of the invention according to which the degree of crimping in the spunbond nonwoven laminate should increase from bottom to top. Incidentally, in examples 15 and 16, the loop diameter of the lowermost layer (made with the first spinning beam) is substantially smaller in example 15 than in example 16. This increased crimp in example 15 is due to the higher mass ratio of the second component (20 wt %) in the bicomponent filaments of the first spinning beam.

BRIEF DESCRIPTION OF THE DRAWING

The above and other objects, features, and advantages will become more readily apparent from the following description, reference being made to the accompanying drawing in which.

SPECIFIC DESCRIPTION OF THE INVENTION

Figure 1:
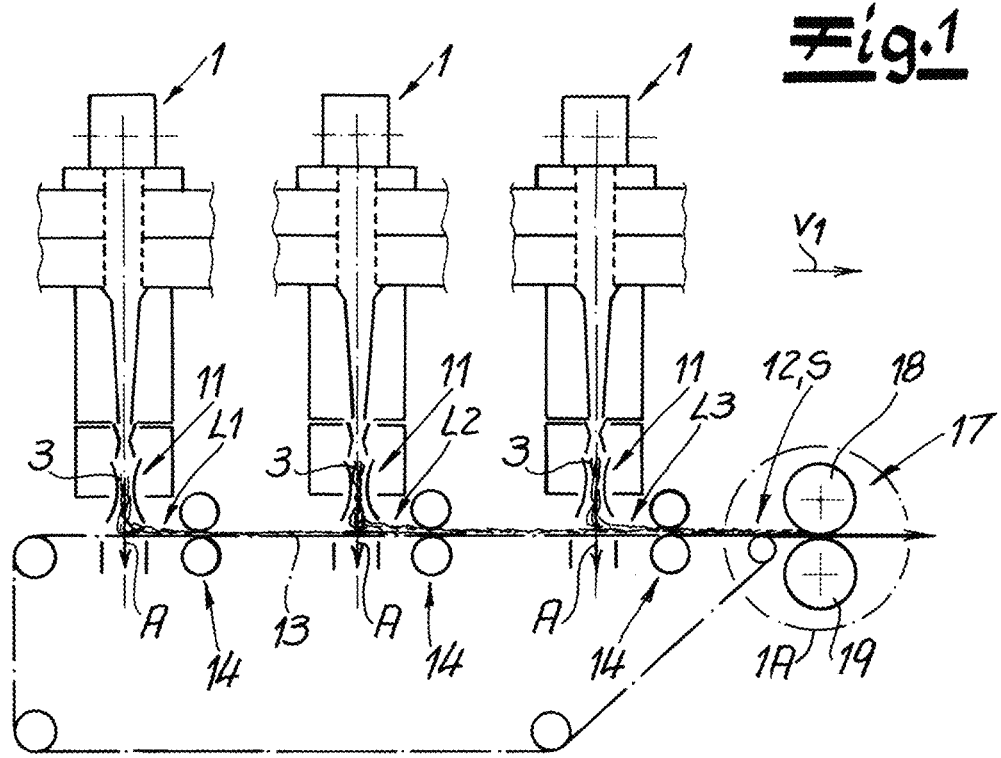
FIG. 1 is a schematic side view of an apparatus for making the laminate of this invention.

As seen in FIG. 1. an apparatus according to the invention for making a spunbond nonwoven laminate S that here has three spunbond nonwoven layers L1, L2 and L3. Corresponding to the three spunbond nonwoven layers L1, L2 and L3, three spinning beams or spinnerets 1 are provided from which, preferably, filaments 3 are spun in the form of bicomponent filaments. After passing through a diffuser 11, the filaments 3 of each spunbond nonwoven layer L1, L2 and L3 are deposited on a mesh conveyor belt 13 to form the spunbond nonwoven layers L1, L2 and L3. Each spunbond nonwoven layer L1, L2, L3 is bonded by a respective pair of compaction rollers 14. The finished three-layer spunbond nonwoven laminate S is then transferred from the mesh conveyor belt 13 to a calender 17 having two calender rolls 18, 19. FIG. 1 also shows an enlarged section of the transfer of the spunbond nonwoven laminate S from the mesh conveyor belt 13 to the calender 17. The mesh conveyor belt 13 is moved at a speed $v_1$, while the calender rolls 18, 19 rotate at a peripheral speed $v_2$. It lies within the scope of the invention if the peripheral speed $v_2$ of the calender rolls 18, 19 is greater than the speed $v_1$ of the mesh conveyor belt 13 by no more than 8%, preferably by no more than 5%.

Figure 2:
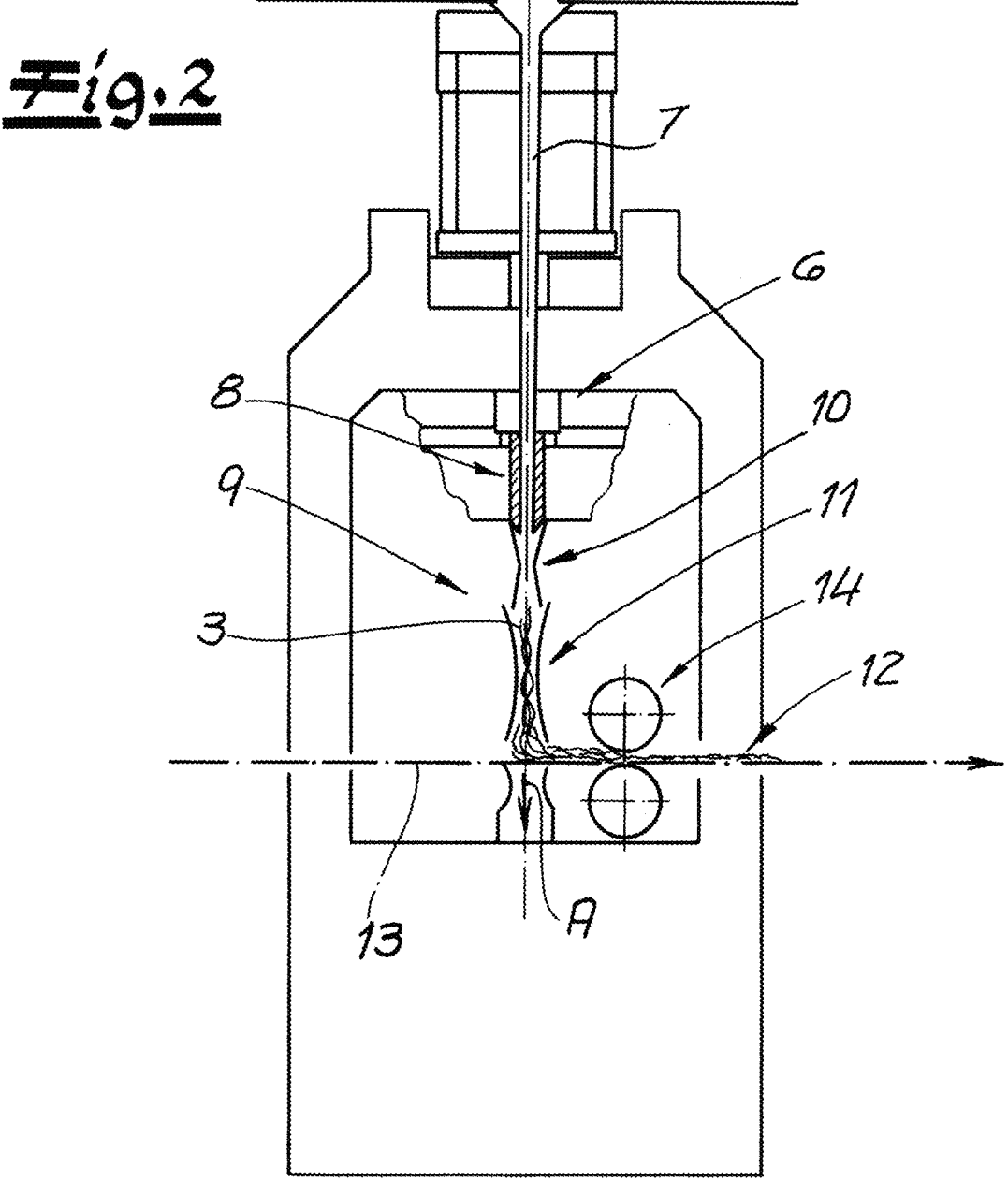
FIG. 2 is a large-scale view of the furthest upstream spinning/depositing subassembly of FIG. 1.

FIG. 2 shows a portion of the apparatus according to the invention near a spinning beam or spinneret 1. A spunbond nonwoven layer L1 or L2 or L3 is made with this part of the apparatus. Preferably, the filaments 3 are spun in the form of bicomponent filaments by the spinneret 1 and subsequently passed through a cooler 2 in order to cool the filaments 3. It is recommended that a monomer extractor 4 be provided between the spinneret 1 and the cooler 2 so that extraction from the filament formation region is done directly below the spinneret 1. In addition to air, especially the gases generated during the spinning of the filaments 3 in the form of decomposition products, monomers, oligomers, and the like are removed here from the system.

Figure 1A:
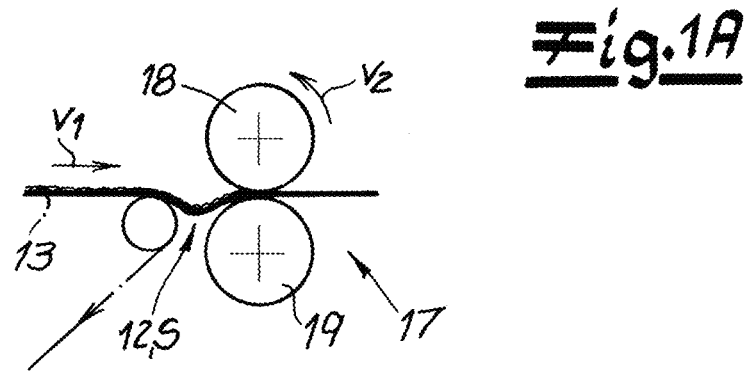
FIG. 1A is a large-scale view of the detail indicated in FIG. 1 at 1A.

In the cooler 2, cooling air is preferably applied from opposite sides to the filament curtain that is being guided from the spinneret 1 to the filament placement area. According to a preferred embodiment shown in FIG. 1A, the cooler is divided into at least two cooling chambers 2a, 2b follow each other in the direction of flow of the filaments 3 and in which process air of different temperatures can be supplied. For instance, low-temperature process air (for example, 20° C.) can be fed into the upstream cooling chamber 2a and process air or cooling air with a higher temperature (for example, 25° C.) can be supplied to the downstream chamber 2b provided below it in the direction of flow. The cooling air is advantageously supplied via air supply cabins 5a and 5b.

A stretcher 6 is provided downstream of or below the cooler 2 with which the filaments 3 passing through the cooler 2 are elongated or stretched. Preferably, the intermediate passage 7 preferably embodied so as to converge toward the deposition area of the filaments 3 and/or to run together in the manner of a wedge, is provided immediately adjacent the cooler 2. Advantageously, the filament curtain enters the down-stretch passage 8 of the stretcher 6 after the intermediate passage 7.

According to a highly recommended embodiment of the invention, the subassembly of the cooler 2 and the stretcher 6 (intermediate passage 7 and down-stretch passage 8) is a closed assembly. The term "closed assembly" means that, in addition to the supply of process air and/or cooling air in the cooler, no additional air is supplied to this unit and the unit is thus designed so as to be closed to the outside. Such a closed assembly is advantageously implemented in the apparatus according to the invention for all parts of the apparatus with spinning beams or spinnerets 1 of making crimped filaments 3.

Preferably, the filaments 3 emerging from the stretcher 6 are guided through a deposition unit 9 that has at least one diffuser 10, 11. Preferably, two diffusers 10, 11 are provided, one downstream of the other. Recommendably, after passing through the deposition unit 9, the filaments 3 deposited on the conveyor or on the mesh conveyor belt 13 to form the nonwoven web 12 and/or the spunbond nonwoven layers L1, L2, and L3. The mesh conveyor belt 13 is preferably a continuous belt.

Advantageously, process air is aspirated down through the mesh conveyor belt 13 in the area where the filaments 3 or nonwoven web 12 are deposited as illustrated in FIGS. 1 and 2 by the arrow A. Recommendably, the deposited nonwoven web 12 or the deposited spunbond nonwoven layers L1, L2, and L3 are initially conducted by the mesh conveyor belt through the gap of a pair of compaction rollers 14 for bonding. As indicated in FIG. 1, the spunbond nonwoven laminate S formed from the spunbond nonwoven layers L1, L2, L3 moves from calender rolls 18, 19 for bonding by a calender 17.

Figure 2A:
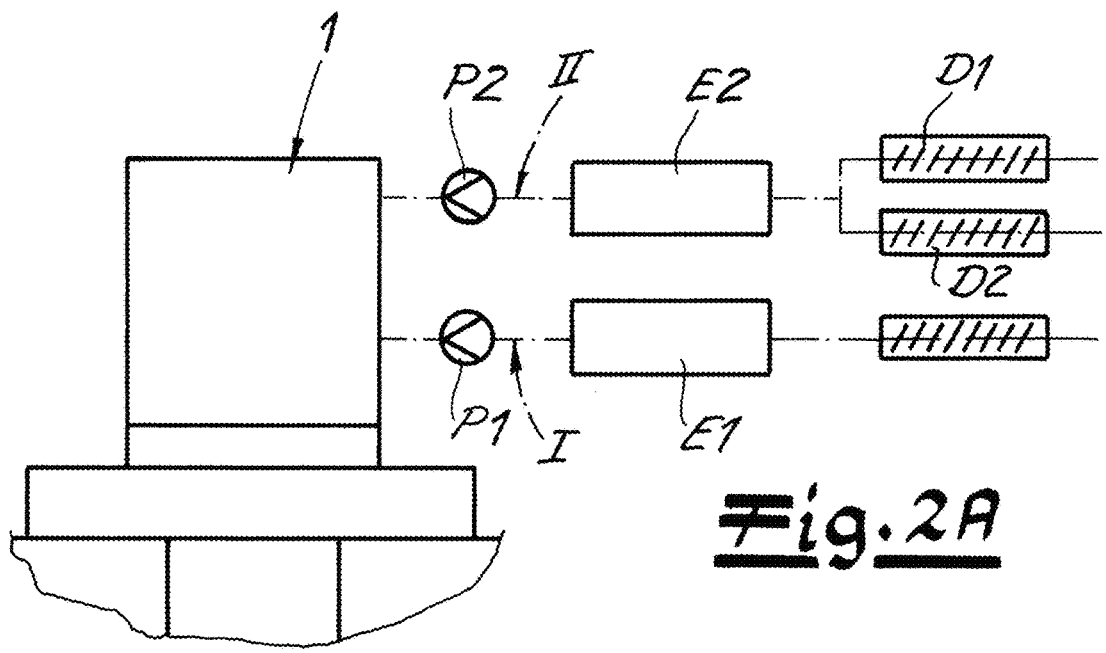
FIG. 2A is a large-scale view of a detail of FIG. 2.

The enlarged section in FIG. 2A shows two extruders E1 and E2 with which the two plastic components I and II of the spinneret 1 are supplied. The plastic component II is a blend (mixture) of plastics, particularly of polypropylenes according to the recommended embodiment. Two metering screws D1 and D2 are provided upstream of the extruder E2 associated with this plastic component II, with one of the two plastics of the blend being fed to the extruder E2 by a respective one of the metering screws D1 and D2. Recommendably, the speed of the metering screw D1 and/or D2 can be controlled with or without feedback online or during execution of the method without switching off the apparatus. Hardware components and/or software components corresponding thereto, not shown, are provided for this purpose. A respective spinning pump P1 and P2 is provided downstream from each of the extruders E1 and E2 for each plastic component I and II with which the mass flow rate of the plastic components I and II can be controlled with or without feedback. It lies within the scope of the invention if this mass flow rate of the two plastic components I and II is controlled online or during execution of the method.

Figure 3A:
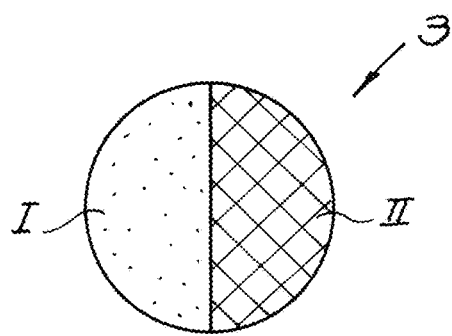
FIGS. 3A, 3B, 3C, and 3D are large-scale sections through bicomponent filaments according to the invention.
Figure 3B:
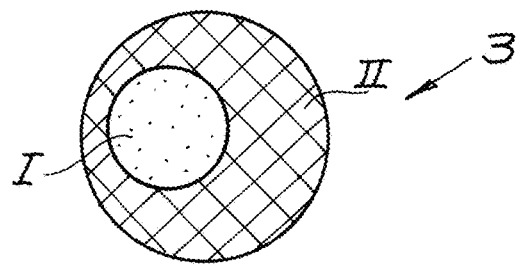
Figure 3C:
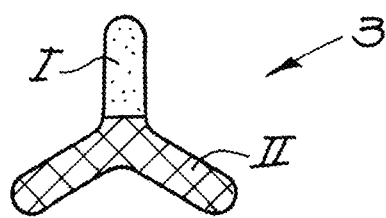
Figure 3D:
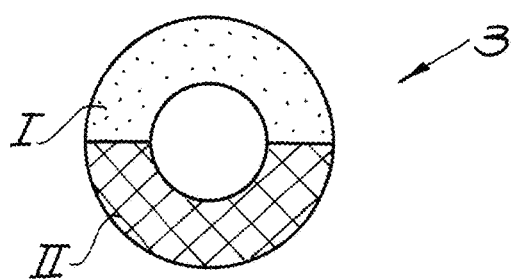

FIG. 3A-3D show typical cross sections for bicomponent filaments that are preferably made using the method according to the invention or by the apparatus according to the invention. Crimped filaments 3 can be made with these filament cross sections of the bicomponent filaments. FIG. 3A shows a typical side-by-side configuration of crimpable bicomponent filaments. A plastic component I or II is provided on each side of this filament cross section. FIG. 3B shows an eccentric core/sheath configuration for crimpable bicomponent filaments. FIG. 3C shows a trilobal cross section for crimpable bicomponent filaments. Finally, FIG. 3D shows a tubular filament 3 in a side-by-side configuration. All of these filament cross sections are suitable of making crimpable bicomponent filaments.

Figure 4A:
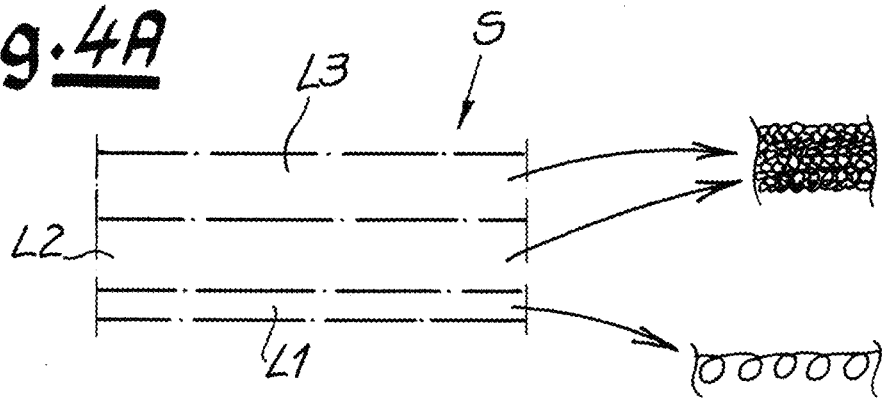
FIGS. 4A, 4B, and 4C are schematic simplified views illustrating three different laminated in accordance with the invention.
Figure 4B:
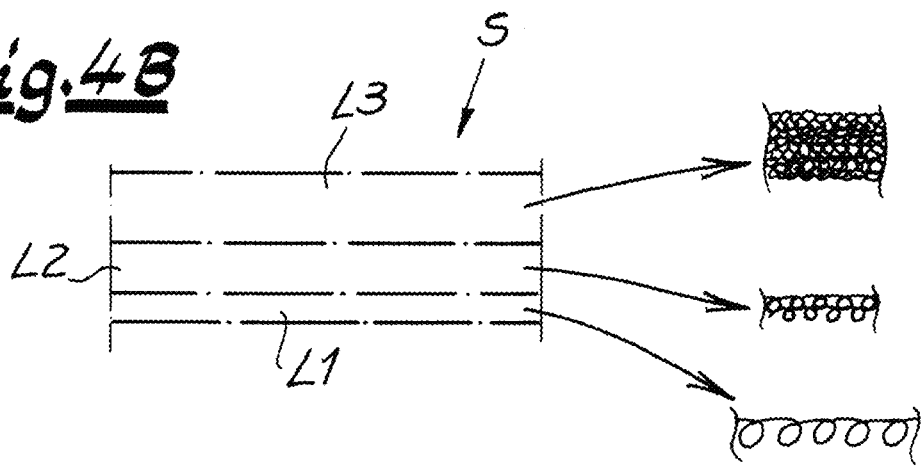
Figure 4C:
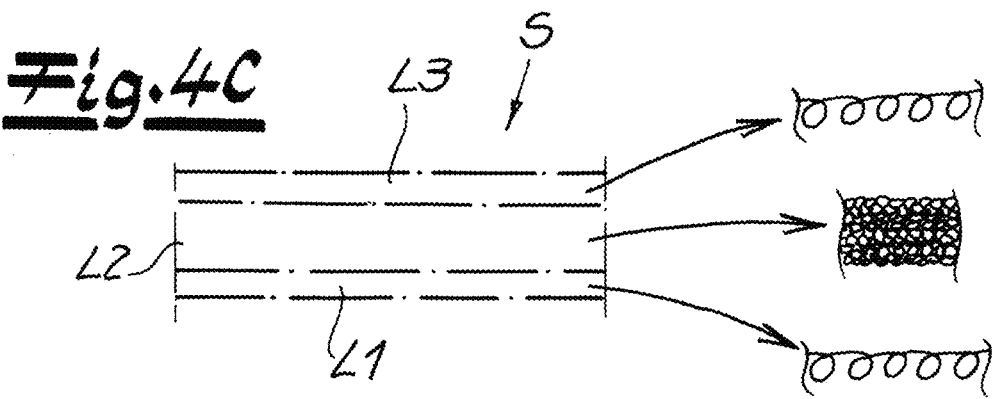
Figure 5:
FIG. 5 is a photomicrograph taken using a "5×" objective lens of an Olympus BX51 microscope with a USB camera.

FIGS. 4A-4C show three spunbond nonwoven laminates S that can be made by the method according to the invention. In all of the examples, the lowermost spunbond nonwoven layer L1 has the least crimp, and the middle spunbond nonwoven layer L2 has greater crimp in comparison. Consequently, the degree of crimping increases from bottom to top in the spunbond nonwoven laminate S. In the spunbond nonwoven laminate S according to FIG. 4A, a "low"/"high"/"high" crimp sequence is observed, while in the example of FIG. 4B, a "low"/"medium"/"high" crimp sequence is observed from bottom to top. Finally, the embodiment according to FIG. 4c shows a crimp sequence of "low"/"high"/"low."

We claim:

1. A method of making a laminate having a plurality of stacked spunbond nonwoven layers, the method comprising the steps of:
    making at least two and at most four of these spunbond nonwoven layers with or from crimped continuous filaments with crimping of the continuous filaments in each of these spunbond nonwoven layers that is equal to at least three loops per centimeter of length and that is different from a degree of crimping of the continuous filaments in the other spunbond nonwoven layers;
    making the crimped continuous filaments of the spunbond nonwoven layers as multicomponent filaments each of a first plastic component that consists of only one first plastic and a second plastic component that is mixture of a second plastic and a third plastic with each of the two first and second plastic components being present in the multicomponent filaments in a proportion of at least 10 wt % and a mass of the third plastic relative to a mass of all the multicomponent filaments of the laminate being less than 25 wt %; and
    setting a molecular weight distribution of the third plastic greater than a molecular weight distribution of the first plastic and greater than a molecular weight distribution of the second plastic.

2. The method according to claim 1, further comprising the steps of:
    setting a melt flow rate of the first component 1.0 to 3 times greater than a melt flow rate of the second component, and/or
    setting a molecular weight distribution ($M_w/M_n$ or $M_z/M_w$) of the first component smaller than the molecular weight distribution of the second component and/or the $M_w/M_n$ value or $M_z/M_w$ value of the second component at least 1.1 times greater than that of the first component, and/or
    setting a difference in melting point between the first and the second component is at least 10° C.

3. The method according to claim 1, further comprising the steps of:
    providing a respective supply unit for the first and second plastic components or for the first, second, and third plastics of a spunbond nonwoven layer, and
    changing an output rate of the plastic component and/or of the plastic by at least one supply unit during ongoing online operation in order to vary the crimping of the spunbond nonwoven layer by varying a speed of the supply unit.

4. The method according to claim 1, further comprising the steps of:
    associating a spinning pump with the plastic components for a spunbond nonwoven layer as a supply unit, and
    changing a feed rate of the plastic component by at least one spinning pump during ongoing online operation in order to vary crimping of the spunbond nonwoven layer by varying a speed of the spinning pump.

5. The method according to claim 1, further comprising the step of:
    varying a proportion of the third plastic during execution of the method in order to vary crimping of the respective spunbond nonwoven layer.

6. The method according to claim 5, further comprising the step of:
    varying a proportion of the second and/or of the third plastic during execution of the method.

7. The method according to claim 5, wherein the second plastic and/or the third plastic is polypropylene.

8. The method according to claim 1, further comprising the step of:
    calendering the laminate in at least one calender.

9. The method according to claim 1, further comprising the steps of:
    transferring the spunbond nonwoven laminate from a conveyor to a calender with rolls,
    setting a travel speed of the conveyor to less than a peripheral speed of the calender rolls, and
    setting a peripheral speed of the calender rolls to no more than 8% greater than a travel speed of the conveyor.

\* \* \* \* \*